(12) United States Patent
Fleischer et al.

(10) Patent No.: US 8,069,195 B2
(45) Date of Patent: Nov. 29, 2011

(54) METHOD AND SYSTEM FOR A WIRING-EFFICIENT PERMUTE UNIT

(75) Inventors: Bruce M. Fleischer, Bedford Hills, NY (US); Hung C. Ngo, Austin, TX (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/968,692

(22) Filed: Jan. 3, 2008

(65) Prior Publication Data

US 2009/0177870 A1 Jul. 9, 2009

(51) Int. Cl.
*G06F 7/00* (2006.01)
(52) U.S. Cl. ......................................... 708/209; 712/300
(58) Field of Classification Search .......... 708/200–209; 712/300
See application file for complete search history.

(56) References Cited

U.S. PATENT DOCUMENTS

| | | | | |
|---|---|---|---|---|
| 6,023,566 A * | 2/2000 | Belkhale et al. | ............... | 716/104 |
| 6,108,366 A * | 8/2000 | Haartsen | ........................ | 708/250 |
| 6,292,762 B1 * | 9/2001 | Moll et al. | ..................... | 708/160 |
| 7,167,021 B1 * | 1/2007 | Lewis | ............................... | 326/37 |
| 7,283,628 B2 * | 10/2007 | Stein et al. | ..................... | 708/492 |
| 7,519,795 B2 * | 4/2009 | Lee et al. | ........................ | 712/223 |
| 7,783,690 B2 * | 8/2010 | Leenstra et al. | .............. | 708/200 |
| 2003/0138098 A1 * | 7/2003 | Cole | ................................ | 380/28 |
| 2004/0148560 A1 * | 7/2004 | Hocevar | ........................ | 714/801 |
| 2004/0210618 A1 * | 10/2004 | Stein et al. | ..................... | 708/842 |
| 2005/0149590 A1 * | 7/2005 | Lee et al. | ........................ | 708/200 |
| 2006/0200514 A1 * | 9/2006 | Fischer et al. | ................. | 708/446 |
| 2007/0011220 A1 * | 1/2007 | Leenstra et al. | .............. | 708/420 |

* cited by examiner

*Primary Examiner* — Chuong D Ngo
(74) *Attorney, Agent, or Firm* — Yudell Isidore Ng Russell PLLC (57) ABSTRACT

A method of providing wiring efficiency in a permute unit. Multiple selectors receive input data and shared control signals from multiple register files. The permute unit includes multiple multiplexors (MUXs) coupled to multiple logical AND gates. The multiple logical AND gates are coupled to multiple logical OR gates. The logical AND gates are physically separated from the logical OR gates. The logical AND gates receive input from one or more output data signals from the selectors. The logical OR gates combine the one or more output signals from the logical AND gates and provide output data from the permute unit.

13 Claims, 7 Drawing Sheets

(Prior Art)

METHOD AND SYSTEM FOR A WIRING-EFFICIENT PERMUTE UNIT

BACKGROUND OF THE INVENTION

1. Technical Field

The present invention relates in general to electronic multiplexer (MUX) circuits. Still more particularly, the present invention relates to an improved method and system for wiring efficiency in a permute unit.

2. Description of the Related Art

Permute units are electronic circuits that use multiplexer (MUX) circuits to shuffle one or more data signals (e.g., vectors) between multiple register files in a computer processor, such as a single instruction multiple data (SIMD) "VMX" processor. VMX SIMD processors may include 256-bit vector registers and may be tuned for floating-point and integer instruction sets.

Figure 1:
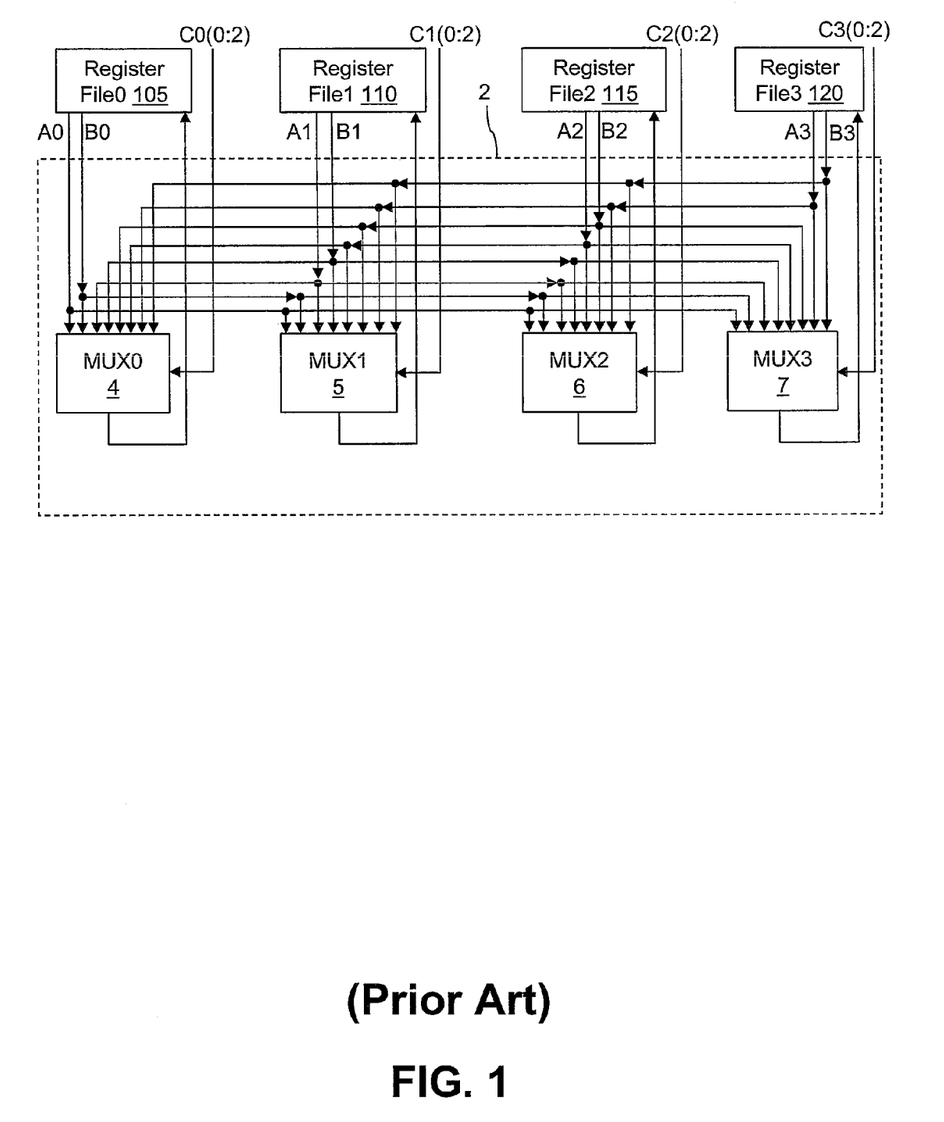
FIG. 1 is a schematic diagram of a permute unit, as utilized in the prior art.

With reference now to FIG. 1, there is depicted a schematic diagram of a permute unit, as utilized in the prior art. Permute unit 2 includes multiplexer (MUX) 0 4, MUX1 5, MUX2 6 and MUX3 7. Each MUX may receive a control signal and one or more data input signals from register file (RF) 0 105, RF1 110, RF2 115, and/or RF3 120. Conventional permute units, such as permute unit 2 which is a 4-way double-precision floating-point SIMD unit, may include more than 512 horizontal wiring tracks or more than 1024 horizontal wiring tracks if inputs come from register bypass busses in addition to the register files. The horizontal wiring tracks function as interconnects between the MUX circuits and also provide control signals to the MUX circuits. However, large numbers of horizontal wiring tracks and long interconnect lengths can impair the overall performance of a permute unit by reducing operating speed and increasing power consumption. Permute units that include large numbers of horizontal wiring tracks also occupy large amounts of physical space, thereby limiting the flexibility of circuit designs by increasing the size of the physical footprint required for the permute unit.

SUMMARY OF AN EMBODIMENT

Disclosed are a method and system for providing wiring efficiency in a permute unit. Multiple selectors receive input data and shared control signals from multiple register files. The permute unit includes multiple multiplexors (MUXs) coupled to multiple logical AND gates. The multiple logical AND gates are coupled to multiple logical OR gates. The logical AND gates are physically separated from the logical OR gates. The logical AND gates mask off input data that will not be the final output results. The logical OR gates receive output values of zero from all logical AND gates except one, which provides output data from the permute unit.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 2:
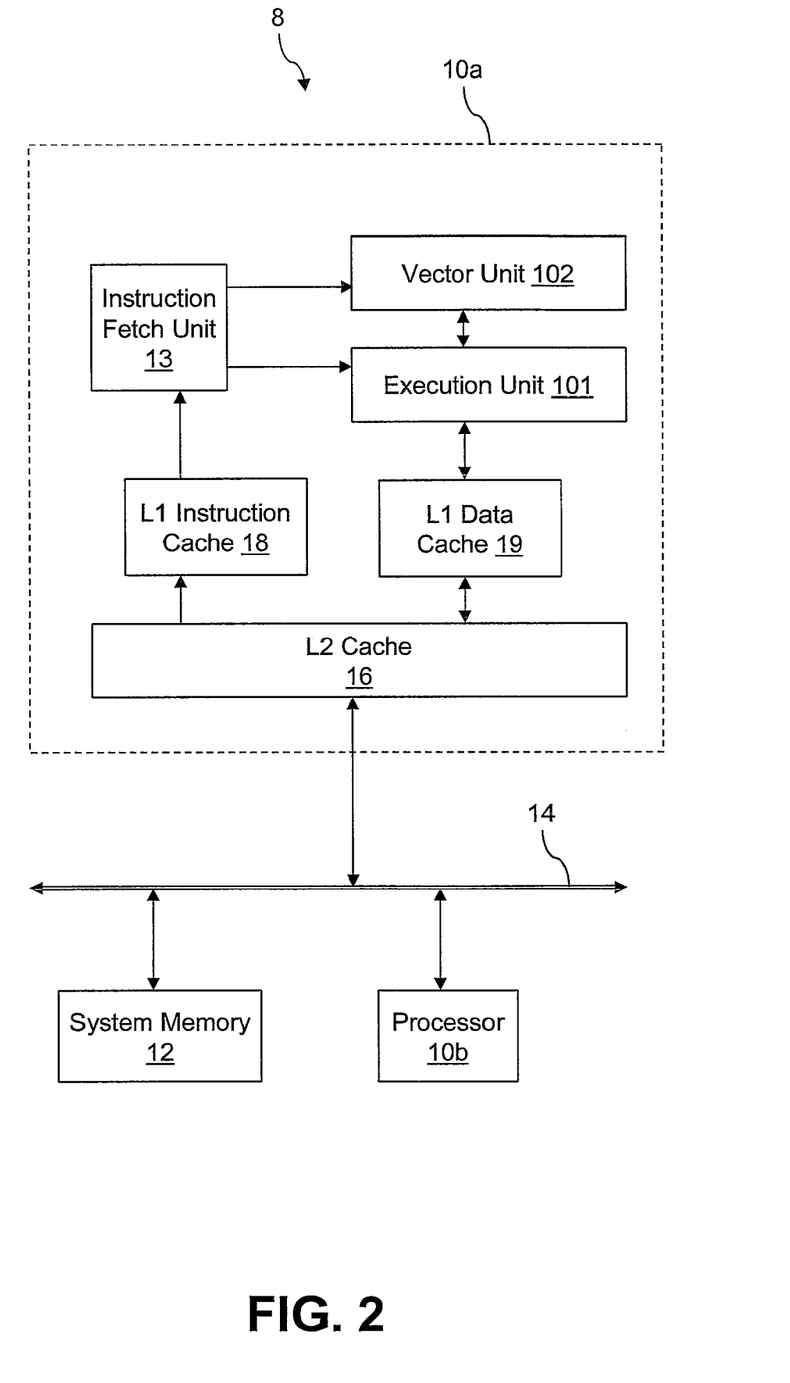
FIG. 2 is an exemplary embodiment of a data processing system in accordance with the present invention.

With reference now to FIG. 2, there is illustrated a high level block diagram of an exemplary data processing system 8 in accordance with the present invention. In one embodiment, data processing system 8 includes a processor 10a comprising a single integrated circuit processor, which, as discussed further below, includes various execution units, registers, buffers, memories, and other functional units that are all formed by integrated circuitry. Processor 10a may be coupled to other devices, such as a system memory 12 and a second processor 10b, by an interconnect fabric 14 to form a data processing system 8 such as a workstation or server computer system. Processor 10a also includes one or more execution units 101, a vector unit 102, and an on-chip multi-level cache hierarchy including a unified level two (L2) cache 16, a level one (L1) instruction (I) cache 18, and a L1 data (D) cache 19.

As is well known to those skilled in the art, caches 16, 18, and 19 provide low latency access to cache lines corresponding to memory locations in system memory 12. Instructions are fetched and ordered for processing by instruction fetch unit 13 within processor 10a. In operation of processor 10a, execution unit 101 and/or vector unit 102 perform one or more operations in response to instructions received from instruction fetch unit 13.

Figure 3:
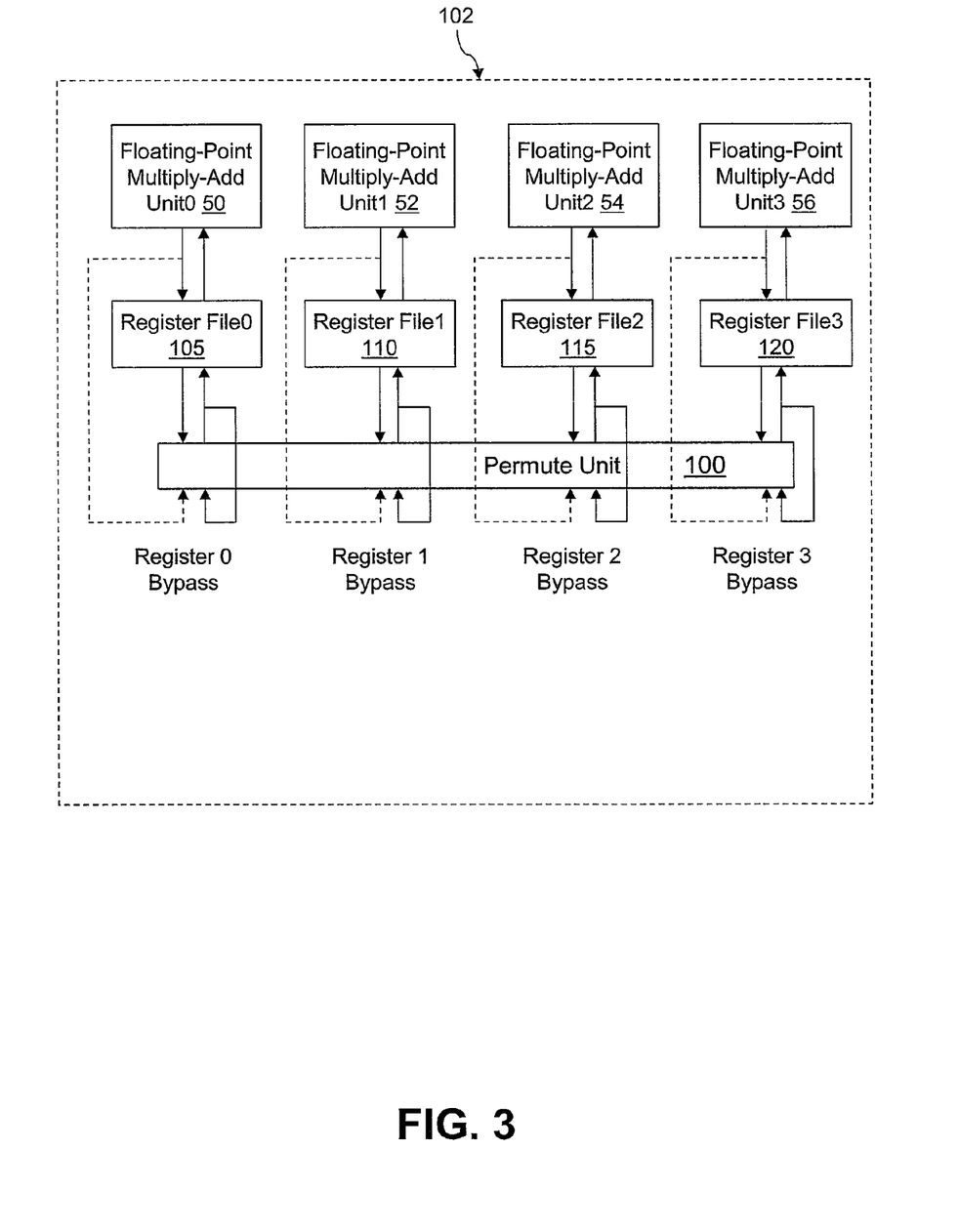
FIG. 3 is an exemplary embodiment of a vector unit, according to an embodiment of the present invention.

With reference now to FIG. 3, there is illustrated a high level block diagram of an exemplary vector unit in accordance with the present invention. As shown, vector unit 102 (FIG. 1) includes multiple floating-point multiply-add (MAD) units that receive instructions from instruction fetch unit 13. MAD unit0 50 and MAD unit1 52 are coupled to register file (RF) 0 105 and RF1 110, respectively. Similarly, MAD unit2 54 and MAD unit3 56 are coupled to RF2 115 and RF3 120, respectively. In one embodiment, each register file may be a 64-bit floating-point register that may store up to thirty-two 64-bit double-precision data. Vector unit 102 may be a single instruction multiple data (SIMD) unit tuned for double-precision floating-point data.

Figure 7:
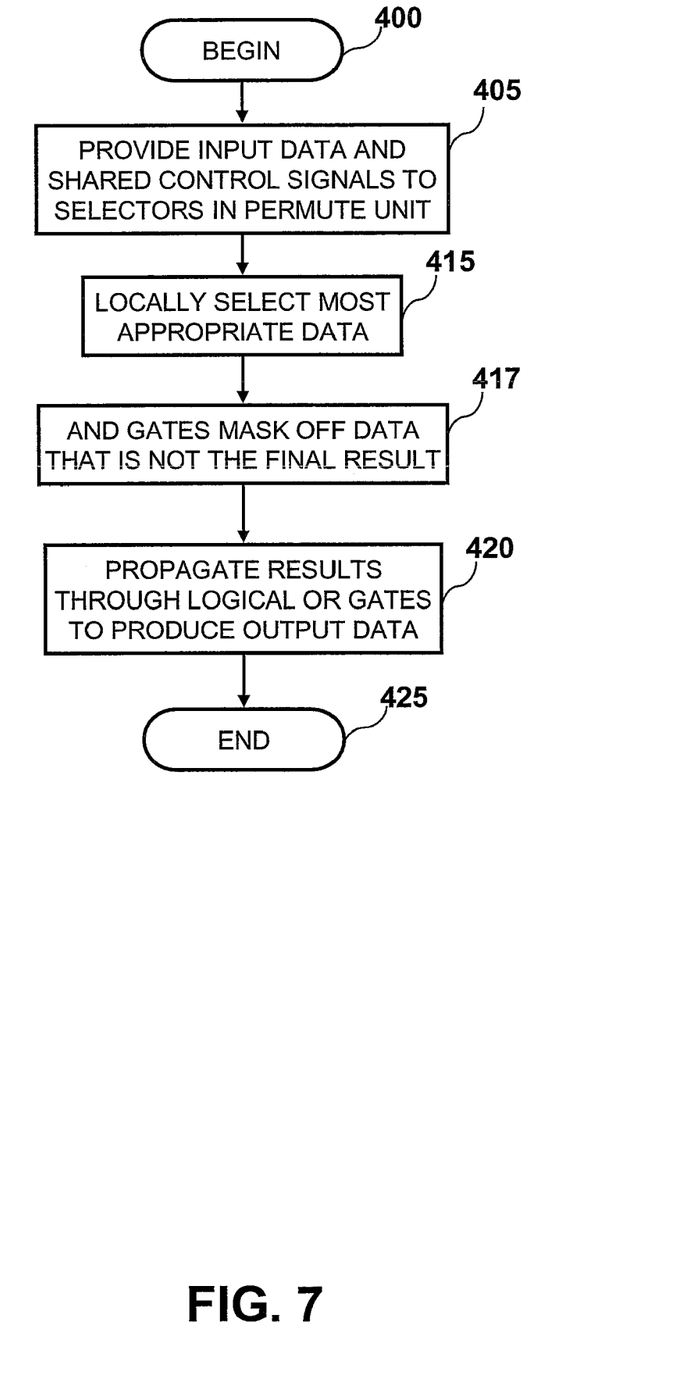
FIG. 7 is a high level logical flowchart of an exemplary method of operating a permute unit, according to an embodiment of the invention.

According to the illustrative embodiment, each register file is coupled to a permute unit 100 that shuffles double-precision floating-point computation results between register files, as illustrated in FIG. 7, which is described below. Permute unit 100 may shuffle one or more floating-point data during a multi-cycle instruction execution period. In one embodiment, an instruction execution period may include 4 cycles. For example, a floating-point datum of a first MAD unit, such as MAD unit3 56, may be shuffled from a first RF, such as RF3 120, to a second RF, such as RF0 105. Permute unit 100 may also include one or more register bypass interconnects that couple one or more outputs of permute unit 100 and/or one or more MAD unit outputs directly to one or more inputs of permute unit 100. The one or more bypass interconnects thus enable permute unit 100 to shuffle one or more data at a shorter time interval than the 4-cycle period (i.e., via one or more feedback loops that bypass one or more register files).

Figure 4:
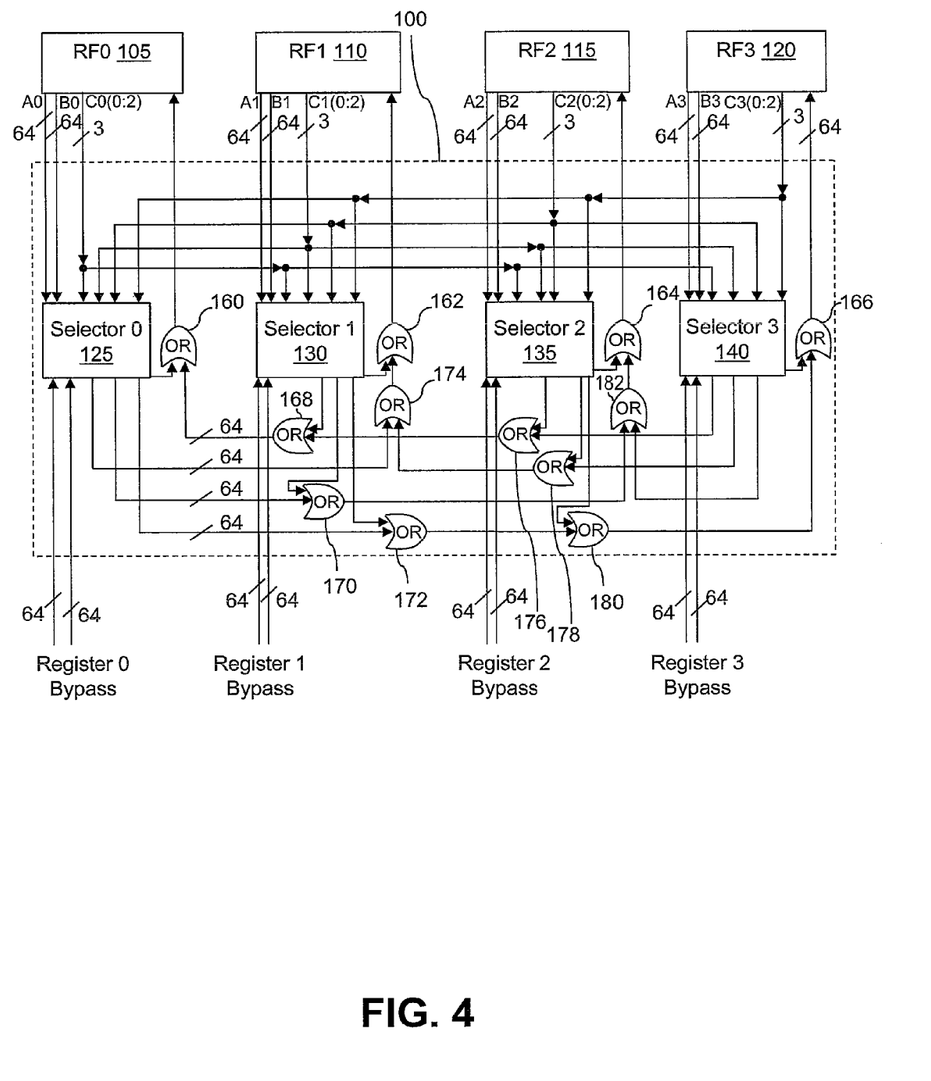
FIG. 4 is a schematic diagram of a distributed permute unit, according to an embodiment of the present invention.

With reference now to FIG. 4, there is depicted a schematic diagram of a distributed permute unit, with which the present invention may be utilized. As shown, distributed permute unit 100 (FIG. 3) includes selector0 125, selector1 130, selector2 135 and selector3 140. As utilized herein, a selector refers to a circuit that includes a multiplexor (MUX) and one or more logical AND gates. Similarly, a distributed permute unit refers to a permute unit that includes one or more selectors having logical AND gates that are coupled to logical OR gates, such that the logical AND gates and logical OR gates are separated by at least a pre-defined distance. The logical AND gates and logical OR gates may be located closely together within a distributed permute unit, or the logical AND gates and logical OR gates may be located far apart from each other. In one embodiment, each selector may receive data input signals and control (i.e., select) signals from one or more different locations.

According to the illustrative embodiment, selectors 125 receives two 64-bit inputs from RF0 105 (FIG. 3) and two 64-bit inputs from a register 0 bypass signal. Selector1 130 receives two 64-bit inputs from RF1 110 (FIG. 3), and two 64-bit inputs from a register 1 bypass signal. Similarly, selector2 135 and selector3 140 receive two 64-bit inputs from RF2 115 and RF3 120 (FIG. 3), respectively, and two 64-bit inputs from a register 2 bypass signal and a register 3 bypass signal, respectively.

According to the illustrative embodiment, selector0 125, selector1 130, selector2 135, and selector3 140, are each coupled to four 3-bit control lines, each of which provides a MUX select signal from one of the registers. A MUX within each selector may thus receive a select signal from RF0 105, RF1 110, RF2 115, and/or RF3 120. In one embodiment, selector0 125, selector1 130, selector2 135, and selector3 140 each have four 64-bit output terminals that are each coupled to a different register via multiple logical OR gates.

For example, different output terminals of selector0 125 are coupled to logical OR gate 160, logical OR gate 174, logical OR gate 170, and logical OR gate 172. Different output terminals of selector1 130 are coupled to logical OR gate 162, logical OR gate 168, logical OR gate 170, and logical OR gate 172. Different output terminals of selector2 135 are coupled to logical OR gate 164, logical OR gate 176, logical OR gate 178, and logical OR gate 180. Similarly, different output terminals of selector3 140 are coupled to logical OR gate 166, logical OR gate 176, logical OR gate 178, and logical OR gate 182. Logical OR gate 160, which provides input to RF0 105, receives a first input from selector0 125 and a second input from logical OR gate 168. Logical OR gate 168 receives a first input from selector1 130 and a second input from logical OR gate 176. Logical OR gate 162, which provides input to RF1 110, receives a first input from selector1 130 and a second input from logical OR gate 174. Logical OR gate 174 receives a first input from selector0 125 and a second input from logical OR gate 178. Logical OR gate 164, which provides input to RF2 115, receives a first input from selector2 135 and a second input from logical OR gate 182. Logical OR gate 182 receives a first input from selector3 140 and a second input from logical OR gate 170. Logical OR gate 166, which provides input to RF3 120, receives a first input from selector3 140 and a second input from logical OR gate 180. Logical OR gate 180 receives a first input from selector2 135 and a second input from logical OR gate 172.

The logical OR gates generate an output signal from multiple output signals from one or more selectors, thereby reducing the number of horizontal interconnects required to shuffle data between register files from 1024 horizontal wires, as depicted in the prior art of FIG. 1, to 268 horizontal wires, as shown in FIG. 4. The 3-bit control signals C0(0:2), C1(0:2), C2(0:2), and C3(0:2) are provided by the register files and may be shared between different selectors. The 3-bit control signals are distributed by horizontal wiring, however the total number of horizontal wires in distributed permute unit 100 (i.e., including the input data A and input data B signal wires) is still reduced since fewer horizontal wires are required to distribute the input data A and input data B signals. Logical OR gates 160 through 182 also act as repowering buffers by preventing signal degradation on long interconnect lines (i.e., logical OR gates 160 through 182 replace the inverters included in conventional long interconnect lines to provide repowering functionality). Each selector may thus provide a 64-bit output signal to RF0 105, RF1 110, RF2 115, and/or RF3 120 in response to a select signal. The operation of distributed permute unit 100 is illustrated in FIG. 7, which is described below.

Figure 5:
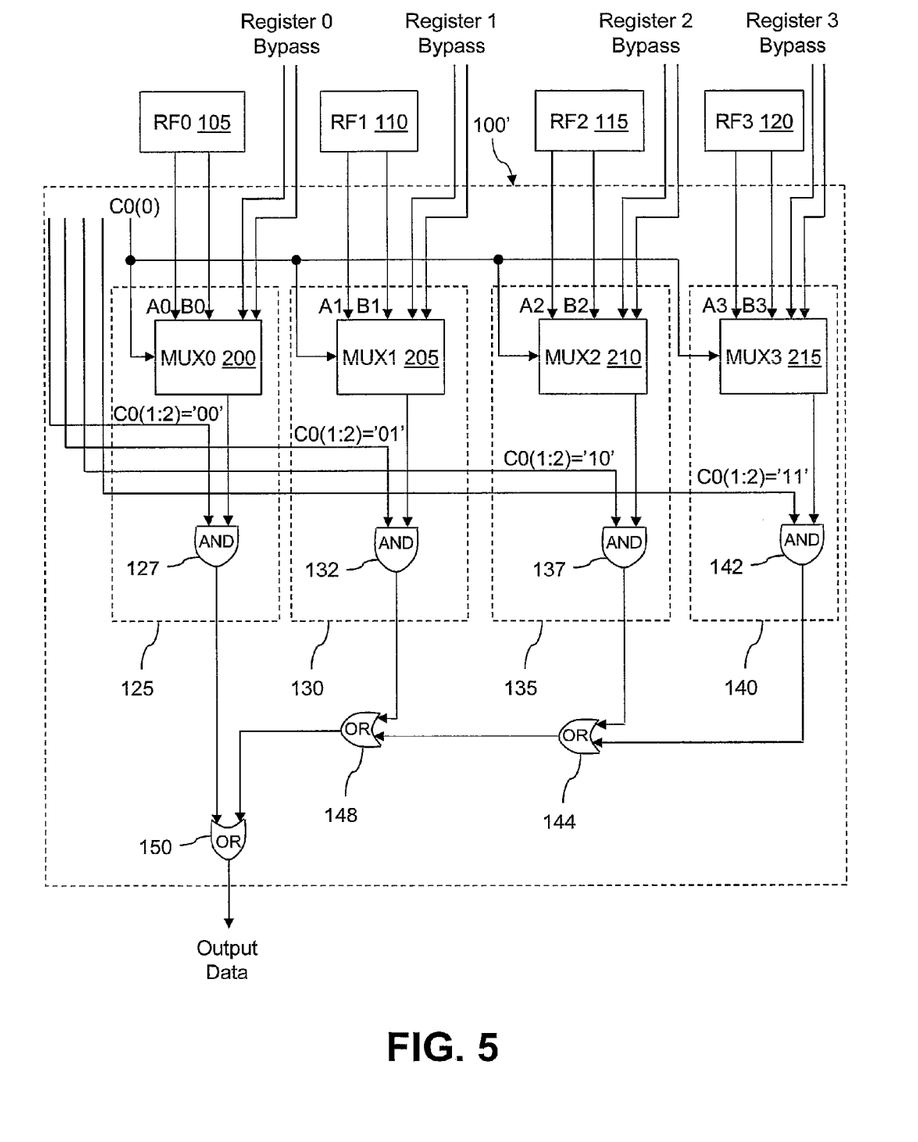
FIG. 5 is a schematic diagram of the distributed permute unit of FIG. 4 from the perspective of a single slice of data, according to an embodiment of the present invention.

With reference now to FIG. 5, there is depicted a schematic diagram of a circuit slice 100' of distributed permute unit 100 (FIG. 4) representing logic for handing a single slice of data, according to an embodiment of the present invention. For example, selector0 125 includes MUX0 200 and logical AND gate 127. MUX0 200 is coupled to RF0 105, which provides data input signals A0 and B0, and one or more register bypass inputs. When MUX0 200 receives a common control signal C0, MUX0 200 provides an output signal to logical AND gate 127, which also receives a second input from control signal C0. Logical AND gate 127 provides an output to logical OR gate 150, which in turn is coupled to an output line (i.e., an output of permute unit 100). Selector1 130 includes MUX1 205 and logical AND gate 132. MUX1 205 is coupled between RF1 110, which provides data input signals A1 and B1, and logical AND gate 132, which receives input from control signal C0 and the output of selector1 130. Similarly, selector2 135 and selector3 140 receive data input from RF2 115 and RF3 120, respectively. Selector2 135 includes MUX2 210 and logical AND gate 137. Selector3 140 includes MUX3 215 and logical AND gate 142. MUX2 210 and MUX3 215 provide output data signals to logical AND gate 137 and logical AND gate 142, respectively. The output of logical AND gates 137 and 142 is combined by logical OR gate 144. Logical OR gate 148 combines the output of logical OR gate 144 and the output of logical AND gate 132. Only one of logical AND gates 127, 132, 137, and 142 provides data from MUXs 200, 205, 210, and 215 to one of logical OR gates 144, 148, and 150. Logical OR gates 144, 148, and 150 thus provides a single slice of output data by combining the data signals from logical AND gates 127, 132, 137, and 142.

According to the illustrative embodiment, distributed permute unit 100 may utilize 256 data wires to distribute results horizontally in a more efficient manner than conventional permute units, which may utilize more than 1024 horizontal data wires and thus consume more power and occupy more physical space than distributed permute unit 100. As described above, logical OR gates 144, 148, and 150 may also function as repowering buffers, thereby eliminating the need to add additional buffers and reducing the propagation time of data signals through distributed permute unit 100.

Figure 6:
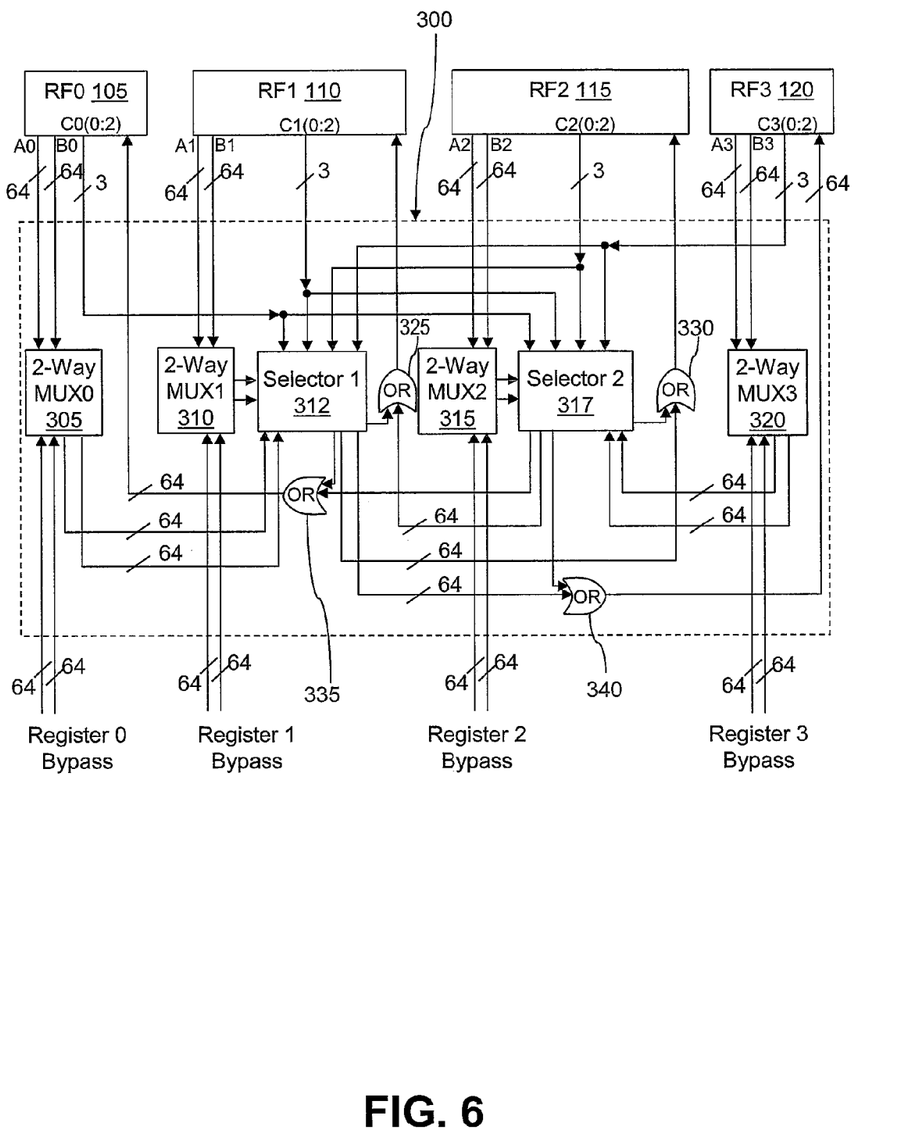
FIG. 6 is a schematic diagram of a hybrid permute unit, according to another embodiment of the present invention.

With reference now to FIG. 6, there is depicted a schematic diagram of a hybrid permute unit 300, according to another embodiment of the present invention. As shown, hybrid permute unit 300 includes both 4-way MUXs and 2-way MUXs.

A 2-way MUX0 305 receives two 64-bit inputs from RF0 105 (FIG. 3) and two 64-bit inputs from a register 0 bypass signal. The output terminals of 2-way MUX0 305 provide two 64-bit input signals to selector1 312. Selector1 312 also receives two 64-bit input signals from 2-way MUX1 310. 2-way MUX1 310 receives two 64-bit inputs from RF1 110 (FIG. 3) and two 64-bit inputs from a register 1 bypass signal. Selector1 312 may provide a first 64-bit output signal to RF0 105 via logical OR gate 335, a second 64-bit output signal to RF1 110 via logical OR gate 325, a third 64-bit output signal to RF2 115 (FIG. 3) via logical OR gate 330, and a fourth 64-bit output signal to RF3 120 (FIG. 3) via logical OR gate 340.

Similarly, a 2-way MUX2 315 receives two 64-bit inputs from RF2 115 and two 64-bit inputs from a register 2 bypass signal. The output terminals of 2-way MUX2 315 provide two 64-bit input signals to selector2 317. Selector2 317 also receives two 64-bit input signals from 2-way MUX3 320. 2-way MUX3 320 receives two 64-bit inputs from RF3 120 and two 64-bit inputs from a register 3 bypass signal. Selector2 317 may provide a first 64-bit output signal to RF0 105 via logical OR gate 335, a second 64-bit output signal to RF1 110 via logical OR gate 325, a third 64-bit output signal to RF2 115 via logical OR gate 330, and a fourth 64-bit output signal to RF3 120 via logical OR gate 340.

According to the illustrative embodiment, selector1 312 and selector2 317 are coupled to four 3-bit bus lines, each of which provides a MUX select signal from one of the registers. A 4-way MUX within each selector may thus receive a select signal from RF0 105, RF1 110, RF2 115, and/or RF3 120. In one embodiment, output data from 2-way MUX0 305 and 2-way MUX3 320 travels toward the center of hybrid permute unit 300 (i.e., toward selector1 312 and selector2 317, respectively). The output data meets the control signals (i.e., the MUX select signals) near the center point and does not propagate across the whole horizontal distance of hybrid permute unit 300. For example, a control signal from RF3 120 may propagate a maximum distance to selector1 312, rather than traveling a longer distance to selector0 125, as shown in FIG. 2. The centralized configuration of hybrid permute unit 300 thus improves performance by reducing the propagation time of the control signals.

Turning now to FIG. 7, there is illustrated a high level logical flowchart of an exemplary method of operating a permute unit, according to an embodiment of the invention. The process begins at block 400 and proceeds to block 405, where register files (e.g., RF0 105, RF1 110, RF2 115, and/or RF3 120 of FIG. 4) provide one or more 64-bit input data signals to the selectors (e.g., selector0 125, selector1 130, selector2 135, and selector3 140), and the register files also provide one or more shared 3-bit control signals to the selectors.

One or more selectors select a 64-bit signal from the 64-bit input signals based on the corresponding 3-bit control signals (i.e., a selector outputs a single most appropriate output data signal using multiple MUX gates), as depicted in block 415. The logical AND gates mask off (i.e., do not output) data that is not the final result, as shown in block 417. The selected output data signal subsequently propagates through logical OR gates, as illustrated in FIG. 5, and the data signal thus emerges from the permute unit as output datum, as shown in block 420. The process subsequently terminates at block 425.

The present invention thus provides a method and system that provide wiring efficiency in a permute unit. Multiple selectors receive input data and shared control signals from multiple register files. The permute unit includes multiple multiplexors (MUXs) coupled to multiple logical AND gates. The multiple logical AND gates are coupled to multiple logical OR gates. The logical AND gates are physically separated from the logical OR gates. The logical AND gates mask off input data that will not be the final output results. The logical OR gates combine the one or more output signals from the logical AND gates and provide an output signal from the permute unit.

It is understood that the use herein of specific names are for explanatory purposes only and not meant to imply any limitations on the invention. The invention may thus be implemented with different nomenclature/terminology and associated functionality utilized to describe the above devices/utility, etc., without limitation.

While the invention has been particularly shown and described with reference to a preferred embodiment, it will be understood by those skilled in the art that various changes in form and detail may be made therein without departing from the spirit and scope of the invention.

What is claimed is:

1. In an electronic permute circuit, a method comprising:
   receiving input data at a plurality of selectors that includes a plurality of multiplexors (MUXs) coupled to a plurality of logical AND gates;
   receiving a plurality of shared control signals at said plurality of selectors;
   the plurality of selectors selecting selected input data from among the input data in response to the plurality of shared control signals utilizing the plurality of MUXs and qualifying the selected input data with the plurality of shared control signals in said plurality of logical AND gates;
   combining multiple output signals of logical AND gates of multiple of the plurality of selectors in a plurality of logical OR gates coupled to and physically separate from said plurality of logical AND gates; and
   providing output data from said plurality of logical OR gates as a permute of said input data.

2. The method of claim 1, wherein said plurality of MUXs comprises a single stage of MUXs.

3. The method of claim 1, wherein said plurality of MUXs comprises a plurality of stages of MUXs.

4. The method of claim 1, wherein receiving said input data further comprises input data for a single instruction multiple data (SIMD) instruction set.

5. The method of claim 1, wherein said electronic circuit further comprises a matrix crossbar switch.

6. The method of claim 1, and further comprising repowering one or more interconnects in the electronic permute circuit by said plurality of logical OR gates.

7. A permute system comprising:
   a plurality of register files;
   a plurality of selectors that receive input data from said plurality of register files and a plurality of shared control signals, wherein said plurality of selectors includes a plurality of multiplexors (MUXs) coupled to a plurality of logical AND gates, wherein the plurality of MUXs selects selected input data from among the input data in response to the plurality of shared control signals and wherein the plurality of logical AND gates qualifies the selected input data with the plurality of shared control signals; and
   a plurality of logical OR gates coupled to and physically separate from said plurality of logical AND gates, wherein said plurality of logical OR gates combines output signals from multiple of said plurality of logical AND gates to obtain a permute of the input data and provides the permute of the input data as an output of said permute system.

8. The permute system of claim 7, wherein said plurality of MUXs comprises a single stage of MUXs.

9. The permute system of claim 7, wherein said plurality of MUXs comprises a plurality of stages of MUXs.

10. The permute system of claim 7, wherein said input data comprises input data for a single instruction multiple data (SIMD) instruction set.

11. The permute system of claim 7, wherein said plurality of MUXs further comprises a matrix crossbar switch.

12. The permute system of claim 7, and further comprising:
interconnects coupled to outputs of the plurality of logical OR gates, wherein said plurality of logical OR gates function as repowering buffers of the interconnects.

13. A data processing system, comprising:
at least one electronic circuit including a permute system in accordance with claim 7;
an interconnect fabric coupled to the at least one electronic circuit; and
a system memory coupled to the interconnect fabric.

* * * * *